US007769646B2

(12) United States Patent
Wyle

(10) Patent No.: US 7,769,646 B2
(45) Date of Patent: Aug. 3, 2010

(54) EFFICIENT WORK FLOW SYSTEM AND METHOD FOR PROCESSING TAXPAYER SOURCE DOCUMENTS

(75) Inventor: David A. Wyle, Newport Coast, CA (US)

(73) Assignee: SurePrep, LLC, Newport Beach, CA (US)

( * ) Notice: Subject to any disclaimer, the term of this patent is extended or adjusted under 35 U.S.C. 154(b) by 48 days.

(21) Appl. No.: 11/766,019

(22) Filed: Jun. 20, 2007

(65) Prior Publication Data

US 2008/0319882 A1 Dec. 25, 2008

(51) Int. Cl.
*G06F 17/22* (2006.01)
*G07F 19/00* (2006.01)
*G06Q 20/00* (2006.01)
(52) U.S. Cl. .......................................... 705/31; 705/19
(58) Field of Classification Search .................... 705/31, 705/19
See application file for complete search history.

(56) References Cited

U.S. PATENT DOCUMENTS

| | | | | | |
|---|---|---|---|---|---|
| 3,963,910 | A | * | 6/1976 | Enomoto et al. | ............... 705/19 |
| 4,754,326 | A | | 6/1988 | Kram et al. | |
| 5,054,096 | A | * | 10/1991 | Beizer | ........................ 382/305 |
| 5,144,115 | A | | 9/1992 | Yoshida | |
| 5,404,294 | A | | 4/1995 | Karnik | |
| 5,737,599 | A | | 4/1998 | Rowe et al. | |
| 5,787,295 | A | | 7/1998 | Nakao | |
| 5,848,426 | A | * | 12/1998 | Wang et al. | .................. 715/210 |
| 5,878,215 | A | | 3/1999 | Kling et al. | |
| 5,923,842 | A | | 7/1999 | Pedersen et al. | |
| 5,940,811 | A | | 8/1999 | Norris | |
| 5,963,926 | A | | 10/1999 | Kumomura | |
| 6,003,019 | A | | 12/1999 | Eaton et al. | |
| 6,009,442 | A | | 12/1999 | Chen et al. | |
| 6,012,050 | A | | 1/2000 | Eaton et al. | |
| 6,021,400 | A | | 2/2000 | Gallacher et al. | |
| 6,128,633 | A | | 10/2000 | Michelman et al. | |
| 6,144,380 | A | | 11/2000 | Shwarts et al. | |

(Continued)

OTHER PUBLICATIONS

SurePrep introduces Tax Prep Workflow System, Anonymous, CPA technology Advsor, Ft. Atkinson, Jun./Jul. 2005, vol. 15, Iss 3, p. 7.*

(Continued)

*Primary Examiner*—Matthew S Gart
*Assistant Examiner*—Harshad Parikh
(74) *Attorney, Agent, or Firm*—Snell & Wilmer L.L.P.

(57) ABSTRACT

A method for processing taxpayer source documents is disclosed. The method may include receiving proforma data and an electronic image of a taxpayer source document, determining a type of tax statement for the taxpayer source document from the electronic image of the taxpayer source document and using the proforma data, a database, and business rules to verify the type of the tax statement for the electronic image of the taxpayer source document. This can be done by searching for an identification code within the electronic image of the taxpayer source document to determine whether the identification code matches the proforma data. The method can also include extracting data from the electronic image of the taxpayer source document and determining if the extracted data from the electronic image of the taxpayer source document has an error. Once the data is extracted, the method can also include creating an electronic document that includes the extracted data.

21 Claims, 13 Drawing Sheets

U.S. PATENT DOCUMENTS

| | | | |
|---|---|---|---|
| 6,173,285 B1 | 1/2001 | Nishita et al. | |
| 6,202,052 B1 | 3/2001 | Miller | |
| 6,209,095 B1 | 3/2001 | Anderson et al. | |
| 6,226,752 B1 | 5/2001 | Gupta et al. | |
| 6,237,011 B1 | 5/2001 | Ferguson et al. | |
| 6,272,484 B1 | 8/2001 | Martin et al. | |
| 6,298,357 B1 | 10/2001 | Wexler et al. | |
| 6,311,165 B1 | 10/2001 | Coutts et al. | |
| 6,338,138 B1 | 1/2002 | Raduchel et al. | |
| 6,369,811 B1 | 4/2002 | Graham et al. | |
| 6,473,741 B1 | 10/2002 | Baker | |
| 6,476,930 B1 | 11/2002 | Roberts et al. | |
| 6,480,866 B2 | 11/2002 | Mastie | |
| 6,510,466 B1 | 1/2003 | Cox et al. | |
| 6,539,479 B1 | 3/2003 | Wu | |
| 6,567,628 B1 | 5/2003 | Guillemin et al. | |
| 6,567,789 B1 | 5/2003 | Baker | |
| 6,572,661 B1 | 6/2003 | Stern | |
| 6,584,505 B1 | 6/2003 | Howard et al. | |
| 6,598,023 B1 | 7/2003 | Drummond et al. | |
| 6,601,173 B1 | 7/2003 | Mohler | |
| 6,658,464 B2 | 12/2003 | Reisman | |
| 6,721,783 B1 | 4/2004 | Blossman et al. | |
| 6,912,508 B1* | 6/2005 | McCalden et al. | 705/31 |
| 6,957,384 B2 | 10/2005 | Jeffery et al. | |
| 7,155,404 B1* | 12/2006 | Johnson et al. | 705/19 |
| 7,171,615 B2 | 1/2007 | Jensen | |
| 7,234,103 B1 | 6/2007 | Regan | |
| 7,257,553 B1 | 8/2007 | Baker | |
| 7,584,884 B2* | 9/2009 | Fox et al. | 235/379 |
| 7,647,258 B2* | 1/2010 | William et al. | 705/31 |
| 7,660,988 B2* | 2/2010 | Carmichael et al. | 713/170 |
| 2001/0037268 A1* | 11/2001 | Miller | 705/31 |
| 2001/0044762 A1 | 11/2001 | Nault | |
| 2002/0133410 A1* | 9/2002 | Hermreck et al. | 705/19 |
| 2002/0161698 A1 | 10/2002 | Wical | |
| 2002/0161796 A1 | 10/2002 | Sylthe | |
| 2002/0184125 A1* | 12/2002 | Cirulli et al. | 705/35 |
| 2003/0036912 A1 | 2/2003 | Sobotta et al. | |
| 2003/0061131 A1 | 3/2003 | Parkan, Jr. | |
| 2003/0163547 A1 | 8/2003 | Beisty et al. | |
| 2003/0233296 A1* | 12/2003 | Wagner | 705/31 |
| 2004/0024665 A1 | 2/2004 | Foster | |
| 2004/0078271 A1* | 4/2004 | Morano et al. | 705/19 |
| 2004/0088233 A1 | 5/2004 | Brady et al. | |
| 2004/0150854 A1 | 8/2004 | Sprague et al. | |
| 2004/0216057 A1 | 10/2004 | Wyle et al. | |
| 2004/0225581 A1 | 11/2004 | Wyle et al. | |
| 2004/0243626 A1 | 12/2004 | Wyle et al. | |
| 2005/0038722 A1 | 2/2005 | Throndson et al. | |
| 2005/0060234 A1* | 3/2005 | Reahard | 705/19 |
| 2005/0065852 A1* | 3/2005 | Bross et al. | 705/19 |
| 2005/0102283 A1 | 5/2005 | Anderson et al. | |
| 2006/0026083 A1 | 2/2006 | Wyle | |
| 2006/0026086 A1* | 2/2006 | Jim | 705/35 |
| 2006/0155618 A1 | 7/2006 | Wyle | |
| 2006/0178961 A1* | 8/2006 | Stanley et al. | 705/31 |
| 2006/0180650 A1* | 8/2006 | Claessens et al. | 235/375 |
| 2007/0033118 A1* | 2/2007 | Hopkinson | 705/31 |
| 2007/0250392 A1* | 10/2007 | Paulsen et al. | 705/19 |
| 2008/0077503 A1* | 3/2008 | Zias et al. | 705/19 |
| 2008/0082432 A1 | 4/2008 | Baker | |
| 2008/0120129 A1* | 5/2008 | Seubert et al. | 705/1 |
| 2008/0147494 A1* | 6/2008 | Larson | 705/14 |

OTHER PUBLICATIONS

Missing Links: an insideer's view, Dauphinais G Williams, PC Magazine, V6, n15, p. 168(2), Sep. 15, 1987.*

Harvey, Greg. Adobe Acrobat 5 PDF For Dummies, 2002, Wiley Publishing, Inc., pp. 13-34.

Cia, Patricia. Managing Your Bookmarks & Favorites, Feb. 25, 1999, SLA, p. 2.

MSPivot, Microsoft Office Excel PivotTable Reports 101, downloaded on Sep. 14, 2008 from http://office.microsoft.com/em-us/excel/HA010346321033.aspx?ac=, 12 pages.

IntelliTax for Windows and DOS, Accounting Technology, v 18, n 9, p. 38, Oct. 2002.

* cited by examiner

FIG. 2

1040Scan Review Wizard - EngagementID: (148940) Client Number: 07302L

Verification: In this step you will verify that 1040Scan read the below displayed data correctly. To Correct data, enter the correct values in the right hand column. To view the entire page of a particular field, click on the View Page icon to the right of the related field image.

Form Type
Field Name        Source Document Image        Correct Value if Required Itemized Deductions2-US    1098:   2005 Amount  1640        ☐ 32g        1160  ☑ 32g
Amount Itemized Deductions3-US      950                ☐ 32h         450  ☐ 32h
Tax return preparation fees Noncash Contributions    CA  FURNITURE          ☐ 32i    FURNITURE  ☑ 32i
Property description      2  09-11-2005
                             07-2004

[Finish Later]                                  [Next>]  [Cancel]

1040Scan Review Wizard - EngagementID: (148940) Client Number: 07302L

Superseded Documents: 1040Scan has identified potentially duplicate copied of the below documents. For each document set below, please indicate whether the documents are duplicates and, if so, which one is the corrected document.

Place a check mark next to superseded documents that should not be entered into the tax return. To view a document, double click on its page number in the window below.

- Form W-2: MCG TEXTILE INC (1) — 35
  - ☐ Page_0017 — 35a
  - ☑ Page_0018(Superseded) — 35b

[Finish Later]    [Next>]    [Cancel]

1040Scan Review Wizard - EngagementID: (148940) Client Number: 07302L

Duplicate Data: 1040Scan has identified potentially duplicate data between the organizer and source document pages listed below. Place a check mark next to the organizer page to prevent its data from being double counted.

Place a check mark next to each organizer page and source document set listed below to indicate they contain duplicate data. Double click on the document icon to view the related pages.

| Organizer | Source Document |
|---|---|
| Miscellaneous Income: | SSA-1099: 111-11-1111 |
| Social security benefits (SSA-1099, box 5)  17244 | Box 5: Net Benefit for 2005  17244 |
| Miscellaneous Income: | SSA-1099: 222-22-2222 |
| Social security benefits (SSA-1099, box 5) - Spouse | Box 5: Net Benefit for 2005  13754 |
| Interest & Dividend - US: JOHNSON COUNTY BK | Form 1099-DIV: JOHNSON COUNTY BK (222-22-22 |
| Total Ordinary Dividends (Box 1a)  480 | Box 1a: Total ordinary dividends  480 |
| Qualified Dividends (Box 1b)  480 | Box 1b: Qualified dividends  480 |
| Rental & Royalty Inc.1-US: TWIDDY AND COMPANY | Form 1099-MISC: TWIDDY AND COMPANY (111-11 |
| Rents received (Form 1099-MISC, box1)  36440 | Box 1: Rents  36440 |
| Adjustments to Income: | Form 1098-E: U.S. DEPARTMENT OF EDUCATION |
| Spouse  1991 | Box 1: Student loan interest received by lender |

Will I need to identify these duplicate forms every year?

Finish Later          Next>          Cancel

EFFICIENT WORK FLOW SYSTEM AND METHOD FOR PROCESSING TAXPAYER SOURCE DOCUMENTS

FIELD OF THE DISCLOSURE

The present invention relates generally to processing taxpayer source documents, and more particularly to an efficient work flow system and method of processing taxpayer source documents by using Optical Character Recognition (OCR), proforma data, databases, and business rules.

BACKGROUND

Traditionally, tax preparation was done by a single accountant. A taxpayer would give the accountant all of his or her source documents and let the accountant prepare the tax returns. The taxpayer, however, would usually have numerous source documents. For example, the taxpayer may have documents such as W-2s, Brokerage Statements, 1099s, K-1s, etc. The accountant would then have to sift through and manually organize the taxpayer's source documents. The accountant would have to transfer all of the tax data from the taxpayer's source documents into the appropriate federal and state tax return forms such as 1040, 1040 E-Z, etc.

With so many taxpayer source documents and different federal and state tax filing forms, the accountant would spend a lot of time organizing, transferring data, and verifying the data. This manual process can be inefficient, error prone and expensive since the accountant has to search for specific tax data to enter into a specific line in a specific tax filing document. Oftentimes, the accountant will have to reuse the same tax data over and over again, but has to reenter the tax data each time. Furthermore, with such a large volume of tax data, the potential for error increases, especially when a single human being is involved. With federal and state penalties increasing for mistakes, this could be disastrous for the taxpayer and the accountant. This problem is compounded when the taxpayer has to file taxes in multiple states and has multiple employers. From an accountant's perspective, this large volume of tax data also presents problems because of potential staff shortages. Not every person is qualified to handle and analyze the large volume of tax data. Thus, this restriction in qualified personnel can lead to staff shortages.

One potential solution is to convert the taxpayer source documents into an electronic form. However, simply scanning the paper taxpayer source documents to be manually read as an electronic image such as a large JPEG is inadequate because the taxpayer source documents would still be unorganized and there is no verification of the tax data. Furthermore, the tax data is not in any form that is easily accessible for automated processing. The accountant would only be able to view the data on his computer, but would still have to manually transfer the tax data to the appropriate federal and state tax filing forms. Thus, there is a need for an invention that better processes a user's taxpayer source documents.

SUMMARY OF THE INVENTION

The present invention is a method for processing and solving the problems above. The method can be implemented, for example, on a machine readable medium. If implemented using a machine readable medium, the present invention can, for example, cause a machine such as a computer to perform certain functions. The machine-readable medium, for example, may be a read only memory (ROM), a random access memory (RAM), a cache, a hard disk drive, a floppy disk drive, a magnetic disk storage media, an optical storage media, a flash memory device or any other device capable of storing information.

In an embodiment, the method of processing a taxpayer source document comprises receiving proforma data and an electronic image of a taxpayer source document. Proforma data can be, for example, data from taxpayer source documents from previous years, previous tax filing documents such (e.g., Federal 1040, California 540, Illinois 1040, etc.) or other various prior data (e.g., 1099-INT, 1099-DIV, etc.).

The method also comprises determining a type of tax statement for the taxpayer source document from the electronic image of the taxpayer source document. The method also comprises using the proforma data to verify data on the taxpayer source document by searching for an identification code within the electronic image of the taxpayer source document to determine whether the identification code matches the proforma data.

The taxpayer source documents can be of various types of tax statements. For example, the types of tax statements can include, but are not limited to, W-2s, Brokerage Statements, 1099-INT, 1099-DIV, K-1s, TAX EXEMPT INTEREST, TAX EXEMPT DIVIDEND, SCH-D Attachment SHORT TERM, SCH-D Attachment LONG TERM, K-1 FORM 1065, K-1 FORM 1120S, K-1 FORM 1041, FORM 1099-R (IRA), FORM 1099-R (PENSION), charity donation receipts, etc. The electronic image can be, for example, in the following formats: Microsoft Word®, PDF, TIFF, JPEG, etc. The identification code can be, for example, an employer's name and/or an employee's social security number for a W-2 form.

The method also comprises extracting data from the electronic image of the taxpayer source document and determining if the extracted data from the electronic image of the taxpayer source document has an error. The data can be, for example, tax data such as first name and last name of the employee, e-mail address of the employee, social security number of the employee, the employee's wages and salaries, the employee's date of birth, interest income, student loan interest paid, alimony paid, federal income tax withheld, etc.

The method also comprises creating an electronic document that includes the extracted data. The electronic document can be, for example, a PDF file, a Microsoft Word® document, etc.

In another embodiment, the method of processing a taxpayer source document comprises receiving proforma data and an electronic image of a taxpayer source document. The method also comprises determining a type of tax statement for the taxpayer source document from the electronic image of the taxpayer source document and selecting a routine corresponding to the type of the tax statement for the taxpayer source document. The routine, for example, can be a separate program, or part of the program embodying the current method. The routine can also correspond to the type of tax statement such as a routine corresponding to a W-2, or a routine corresponding to a 1099, or a routine corresponding to a 1098.

Furthermore, the method comprises using the routine corresponding to the type of the tax statement for the taxpayer source document and the proforma data to verify the type of the tax statement for the taxpayer source document by searching for an identification code within the electronic image of the taxpayer source document. The method also comprises using the routine corresponding to the type of the tax statement for the taxpayer source document and the proforma data to extract tax data from the electronic image of the taxpayer source document.

In addition, the method comprises determining if the extracted data from the electronic image of the taxpayer source document has an error by flagging and verifying the extracted data from the electronic image of taxpayer source document that may be an error either through an inability to extract the tax data with a predetermined amount of accuracy or an analysis of the extracted tax data using business rules, and creating an electronic document that includes the extracted data. The flagging can be done, for example, by highlighting the tax data in a predetermined color, a mark such as a check or question mark beside the tax data, etc.

Furthermore, the predetermined amount of accuracy, for example, can be 70%, 75%, 80%, 85%, 90%, 95% or 100% match between the data extracted in the taxpayer source document and the related proforma data, other data, or business rules. Also, the business rules can be used to indicate if there is a potential error. For example, if the employee compensation information is listed as $12,345 in one form and is listed as $12,435 in another form, there is a potential error. Furthermore, for example, currently social security wages should be the lesser of total wages or $94,200 (for tax year 2006). If it is listed as $95,000, there may be a potential error. Also, if, for example, the sum of box 1, box 2, and box 3 should equal the amount listed in box 4, but the sum of box 1, box 2, and box 3 do not equal the amount listed in box 4, there may be a potential error. These business rules listed are merely exemplary and are not limited to the examples above.

The business rules could also be used to indicate that the extracted tax data is correct to reduce the amount of verification necessary. For example, if the sum of box 1, box 2, and box 3 should be equal to the amount listed in box 4, and the sum of box 1, box 2, and box 3 actually do equal the amount listed in box 4, then it is likely that the data indicated in box 1, box 2, box 3, and/or box 4 are correct. Thus, there may not be a need to further verify the data in box 1, box 2, box 3, and/or box 4. This could potentially save a lot of time by reducing the amount of verification necessary.

In yet another embodiment, the method of processing a taxpayer source document comprises receiving proforma data and an electronic image of a taxpayer source document and determining a type of tax statement of the taxpayer source document for the electronic image of the taxpayer source document using optical character recognition by searching for predetermined characters in predetermined locations of the electronic image of the taxpayer source document, wherein the taxpayer source document is either an income document, an adjustment to income document, or a deduction document.

Optical character recognition can be, for example, software designed to translate images of handwritten or typewritten text into a machine readable text. A wage document can include, for example, the types of tax statements that deal with wages such as a W-2. An investment document can include, for example, the types of tax statements that deal with interests such as 1099-INT. A deduction document can include, for example, the types of tax statements that deal with tax deductions such as receipts for charitable contributions or documents related to business expenses eligible for tax deductions.

The method also comprises selecting a routine corresponding to the type of taxpayer source document and using the routine corresponding to the type of taxpayer source document, optical character recognition, a supplemental database, and proforma data to verify the type of taxpayer source document for the electronic image of the taxpayer source document by searching for an identification code within the electronic image of the taxpayer source document. The method also uses the routine corresponding to the type of taxpayer source document, optical character recognition, the supplemental database, business rules, and proforma data to extract tax data from the electronic image of the taxpayer source document. The supplemental database can be, for example, an optical character recognition database with 5 databases of 2,000 financial institution names for a total of 10,000 financial institution names.

Furthermore, the method can also determine if the extracted data from the electronic image of the taxpayer source document has an error by flagging, verifying and correcting the extracted data from the electronic image of taxpayer source document that may be an error either through an inability to extract the tax data with a predetermined amount of accuracy or an analysis of the extracted tax data using business rules.

In addition, the method can also assign unassociated images of the taxpayer source documents to parent taxpayer source documents, determine if the electronic image of the taxpayer source document is superseded, determine if the electronic image of the taxpayer source document is a duplicate, determine if the electronic image of the taxpayer source document is a new taxpayer source document, supplement the proforma data with tax data extracted from the electronic image of the taxpayer source document, and create an electronic document that includes the extracted tax data.

BRIEF DESCRIPTION OF THE DRAWINGS

The exact nature of this present invention, as well as the objects and advantages thereof, will become readily apparent from consideration of the following specification in conjunction with the accompanying drawings in which like reference numerals designate like parts throughout the figures thereof and wherein:

FIG. 2 is a screen shot that allows a user via a computer to submit a job for optical character recognition in accordance with an embodiment of the present invention.

FIGS. 5-12 are screen shots corresponding to the method of FIG. 4 of reviewing and modifying the data extracted from the electronic image of the taxpayer source document in accordance with an embodiment of the present invention.

DETAILED DESCRIPTION

Reference will now be made to the preferred embodiments of the present invention, examples of which are illustrated in the accompanying drawings. While the present invention will be described in conjunction with the preferred embodiments, it will be understood that these embodiments are not intended to limit the scope of the present invention. On the contrary, the present invention is intended to cover alternatives, modifications and equivalents, which may be included within the spirit and scope of the present invention as defined by the appended claims. In the following detailed description, numerous specific details are set forth in order to provide a thorough understanding of the present invention. However, it will be understood by one skilled in the art that the present invention may be practiced without these specific details. In other instances, well known systems, components, methods and procedures have not been described in detail so as not to unnecessarily obscure the important features of the present invention. As will be appreciated, various embodiments of the present invention are described herein and shown in the figures.

Figure 1:
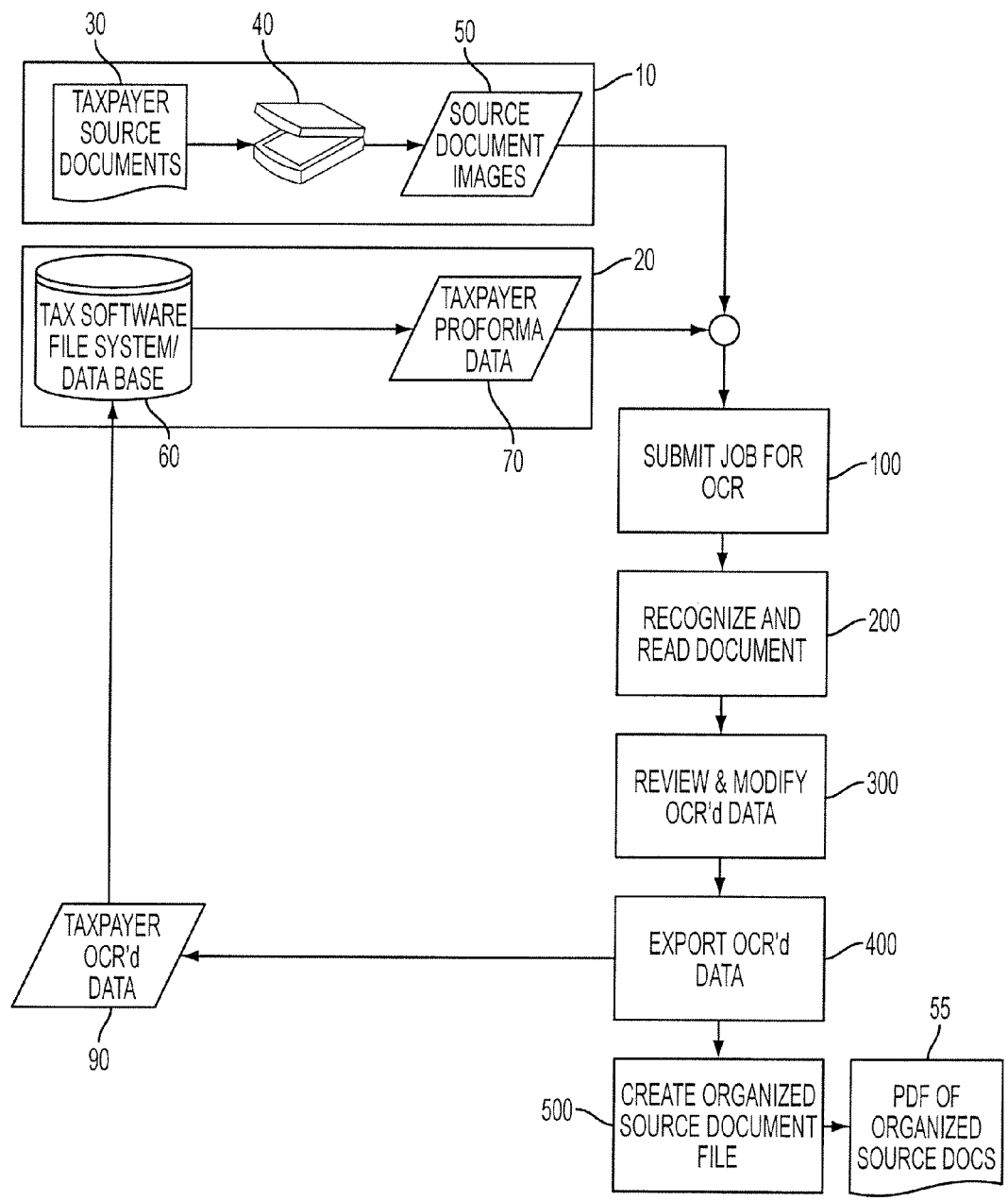
FIG. 1 is a flow chart of a method of processing taxpayer source documents in accordance with an embodiment of the present invention.

FIG. 1 is a flow chart of a method of processing taxpayer source documents in accordance with an embodiment of the present invention. In step 10, an electronic image 50 of a taxpayer source document 30 is created using a scanner 40. That is, the taxpayer source document 30 is scanned in by the scanner 40 to produce the electronic image 50 of the taxpayer source document 30. In step 20, the appropriate taxpayer proforma data 70 is retrieved from a tax software file system database 60. The electronic image 50 of the taxpayer source document 30 and the taxpayer proforma data 70 are processed to have their data extracted, for example, using optical character recognition. Although optical character recognition is used, other methods of extraction are contemplated. The taxpayer proforma data 70 can be, for example, data from taxpayer source documents from previous years, previous tax filings (e.g., Federal 1040, California 540, Illinois 1040, etc.) or other prior data (e.g., 1099-INT, 1099-DIV, etc.).

Figure 2:
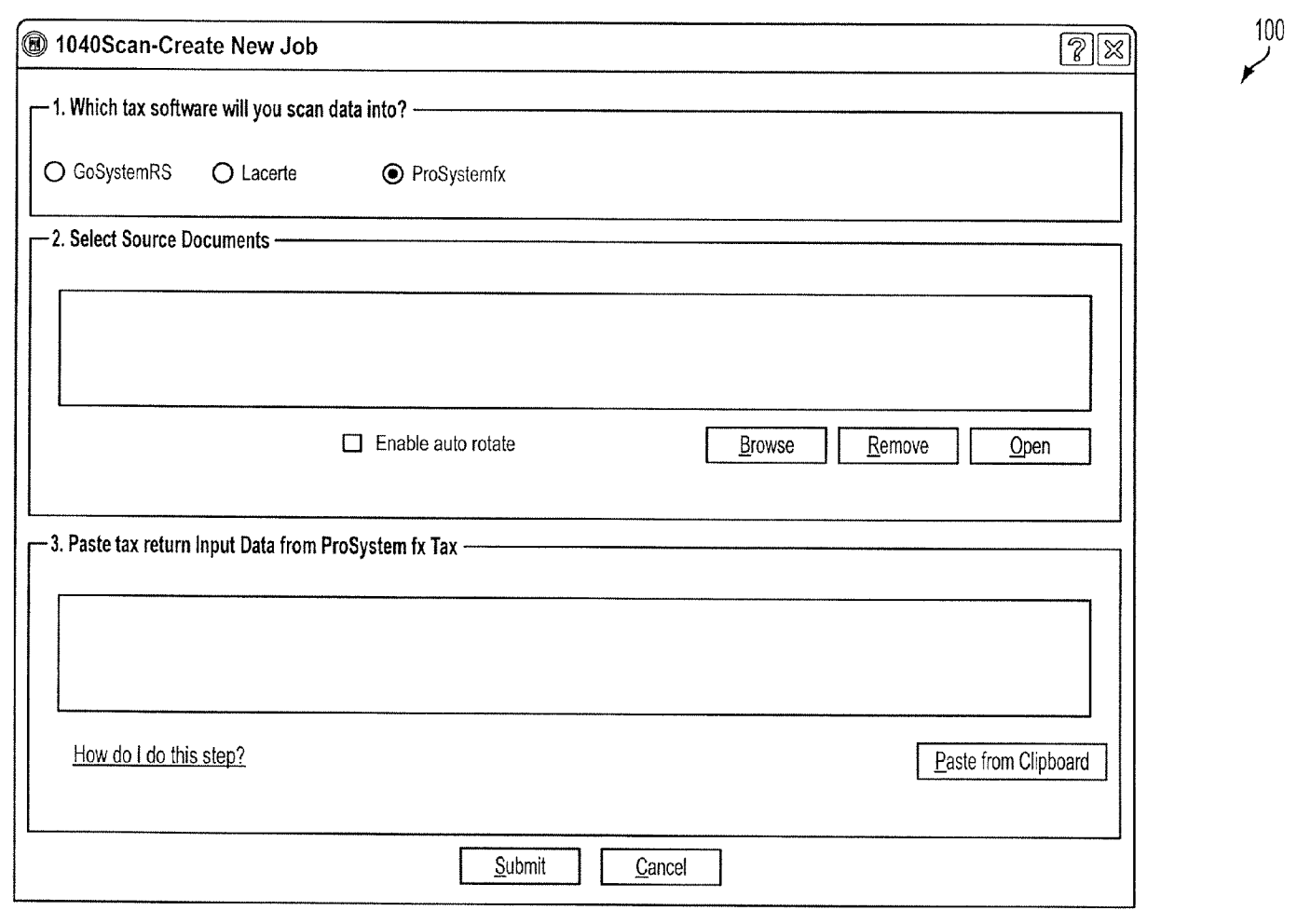

FIG. 2 is a screen shot that allows a user via a computer (i.e., a processor or a computer program) to submit a job for optical character recognition (step 100) in accordance with an embodiment of the present invention. It is contemplated that before moving to step 300, steps 10, 20, 100 and 200 are repeated for each individual sheet of the taxpayer source documents until all of the individual sheets of taxpayer source documents have been processed through steps 10, 20, 100 and 200 (see FIG. 1). It is also contemplated that steps 10, 20, 100, 200, 300, 400 and 500 can all be completed for individual sheets of the taxpayer source documents until all of the individual sheets of the taxpayer source documents have been processed through steps 10, 20, 100, 200, 300, 400 and 500.

Figure 3:
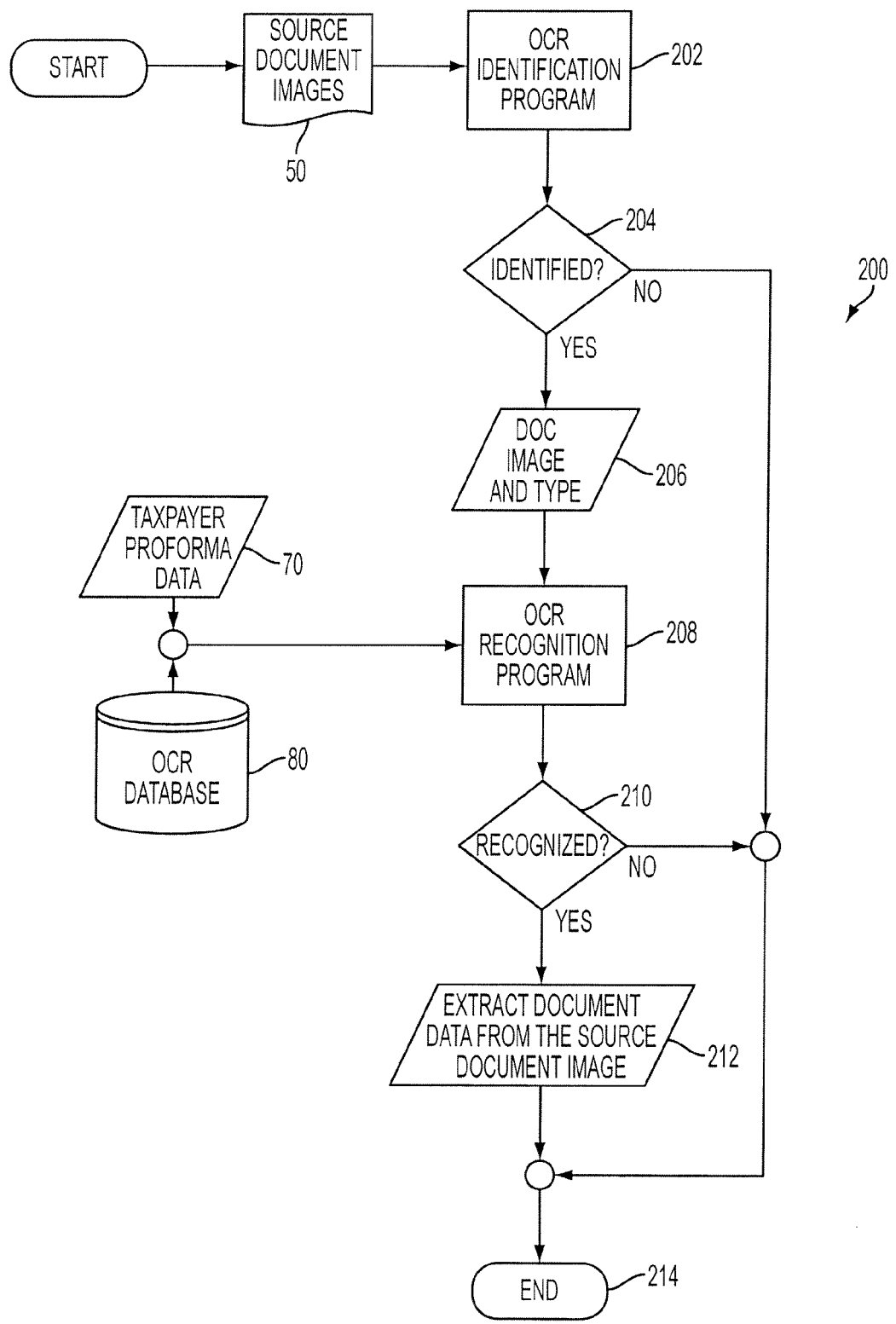
FIG. 3 is a flow chart of a method of recognizing and reading an electronic image of a taxpayer source document in accordance with an embodiment of the present invention.

In step 200, the computer recognizes and reads the electronic image of the taxpayer source document. FIG. 3 is a flow chart of the steps involved in recognizing and reading the electronic image 50 of the taxpayer source document 30. In step 202, an identification program, such as an optical character recognition program, attempts to identify a type of tax statement for the electronic image 50 of the taxpayer source document 30. The identification program identifies the electronic image 50 by determining whether the electronic image 50 is a W-2, Brokerage Statement, 1099-INT, 1099-DIV, K-1, TAX EXEMPT INTEREST, TAX EXEMPT DIVIDEND, SCH-D Attachment SHORT TERM, SCH-D Attachment LONG TERM, K-1 FORM 1065, K-1 FORM 1120S, K-1 FORM 1041, FORM 1099-R (IRA), FORM 1099-R (PENSION), charity donation receipt, etc. If the type of tax statement for the electronic image 50 of the taxpayer source document 30 is identified, then the next step is 206. Otherwise, if the electronic image 50 cannot be identified, then the method is concluded at step 214, and the electronic image 50 of the taxpayer source document 30 does not get processed by 300 or 400. The electronic image 50 that cannot be identified is included as an unidentified electronic image in step 500. However, no tax data from the electronic image 50 is exported.

If, however, the type of tax statement is identified in step 204, the method continues to step 206. In step 206, the electronic image 50 and the type of tax statement are sent to the appropriate recognition program. The type of the tax statement determines which recognition program is to be used to process the electronic image 50. For example, if the type of tax statement is a W-2, then the electronic image 50 is sent to a W-2 recognition program.

In step 208, the appropriate recognition program receives the electronic image 50 of the taxpayer source document 30 and also the taxpayer proforma data 70 and data from the OCR database 80. The appropriate recognition program corresponding to the type of taxpayer statement verifies the type of taxpayer source document for the electronic image by searching for an identification code within the electronic image 50 of the taxpayer source document 30. To find the identification code, the appropriate recognition program can use, for example, optical character recognition in conjunction with a supplemental database such as the OCR database 80 and the taxpayer proforma data 70.

The identification code can be, for example, the employer's name and/or an employee's social security number for a W-2 form. Searching for an identification code can be advantageous rather than searching for text which might indicate the presence of tax data such as "Employee's name, address, and ZIP code" because the identification code will often be in larger text and it may be easier for the optical character recognition to recognize larger text. Furthermore, text which might indicate the presence of tax data might be omitted from the taxpayer source document altogether. Also, since there is generally no uniform standard format for the taxpayer source document, the text, which might indicate the present of tax data, can often vary from taxpayer source document to taxpayer source document depending on who generates the taxpayer source document. For example, the text which might indicate the presence of an employee's social security number might be any one of "Employee's SSN," "Employee's Social Security," "Employee's SSN#," "Employee's Social Security Number," "Employee's SSA Number," "Social Security Number," etc.

The identification code can be, for example, the name of a financial institution such as "Fidelity Investments" for a 1099-INT. The OCR database 80 can, for example, contain a database of names or identifications which may correspond to identification codes which the recognition program searches for in the electronic image 50 of the taxpayer source document 30. The OCR database 80 can include multiple databases, for example, five (5) databases of 2,000 financial institution names for a total of 10,000 financial institution names. The recognition program searches the first database, then the second database, then the third database, then the fourth database, and finally the fifth database. The first database contains, for example, 2000 of the most popular financial institution names. The second database contains, for example, the next 2000 most popular financial institution names. It is contemplated that the number of databases, the number of financial institution names contained within each database, and the total number of financial institution names could be appropriately varied. Furthermore, it is contemplated that the supplemental database can contain other information aside from or in addition to financial institution names including but not limited to employer names, financial investment information, etc.

In step 210, if the type of tax statement for the taxpayer source document is not recognized or verified, the method ends at step 214. However, if the type of tax statement for the taxpayer source document is recognized or verified, then data, such as tax data, is extracted from the electronic image 50 in step 212. If, for example, the tax data could not be extracted from the electronic image 50 with a predetermined amount of accuracy, or a potential error is identified through the use of business rules, the tax data could be flagged for later review. The predetermined amount of accuracy, for example, could be a 70%, 75%, 80%, 85%, 90%, 95% or 100% match between the actual tax data in the taxpayer source document and the extracted tax data. For example, the text "Washiington Mutual" might be a match with the text "Washington Mutual" if the predetermined amount of accuracy is set at 90% or below. Also, the text "Merrill Linch" might be a match with the text "Merrill Lynch" if the predetermined amount of accuracy is set at 85% or below.

Also, the recognition program can use business rules to indicate if there is a potential error. For example, if the employee compensation information is listed as $12,345 in one form and is listed as $12,435 in another form, there is a potential error. Furthermore, for example, currently social security wages should be the lesser of total wages or $94,200 (for tax year 2006). If it is listed as $95,000, there may be a potential error. Also, if, for example, the sum of box 1, box 2, and box 3 of the taxpayer source document should equal the amount listed in box 4 of the taxpayer source document, but the sum of box 1, box 2, and box 3 does not equal the amount listed in box 4, there may be a potential error. These business rules listed are merely exemplary and are not limited to the examples above and include other rules such as those mandated by the United States Internal Revenue Services, mathematical certainties, etc.

However, the business rules can also be used to reduce the amount of tax data that is flagged for later review. For example, if the sum of box 1, box 2, and box 3 should be equal to the amount listed in box 4, and the sum of box 1, box 2, and box 3 actually do equal the amount listed in box 4, then it is likely that the data indicated in box 1, box 2, box 3, and/or box 4 are correct. Thus, there may not be a need to further verify the data in box 1, box 2, box 3, and/or box 4. This could potentially save a lot of time by reducing the amount of verification necessary. Such data could be indicated by a flag, a check mark, or other indicia to indicate to the user that the data does not need to be reviewed for example in step 300.

After the tax data is extracted from the electronic image 50 (step 212), the method ends at step 214 and proceeds to step 300 for review and modification.

Figure 4:
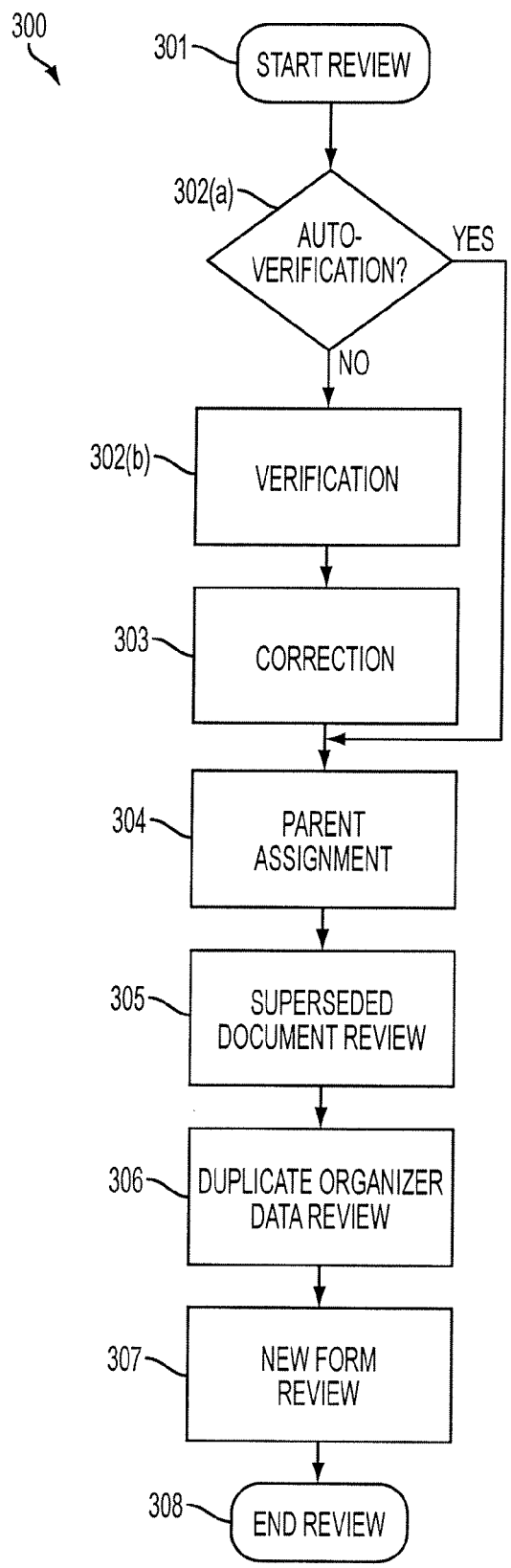
FIG. 4 is a flow chart of a method of reviewing and modifying data extracted from the electronic image of the taxpayer source document in accordance with an embodiment of the present invention.
Figure 5:
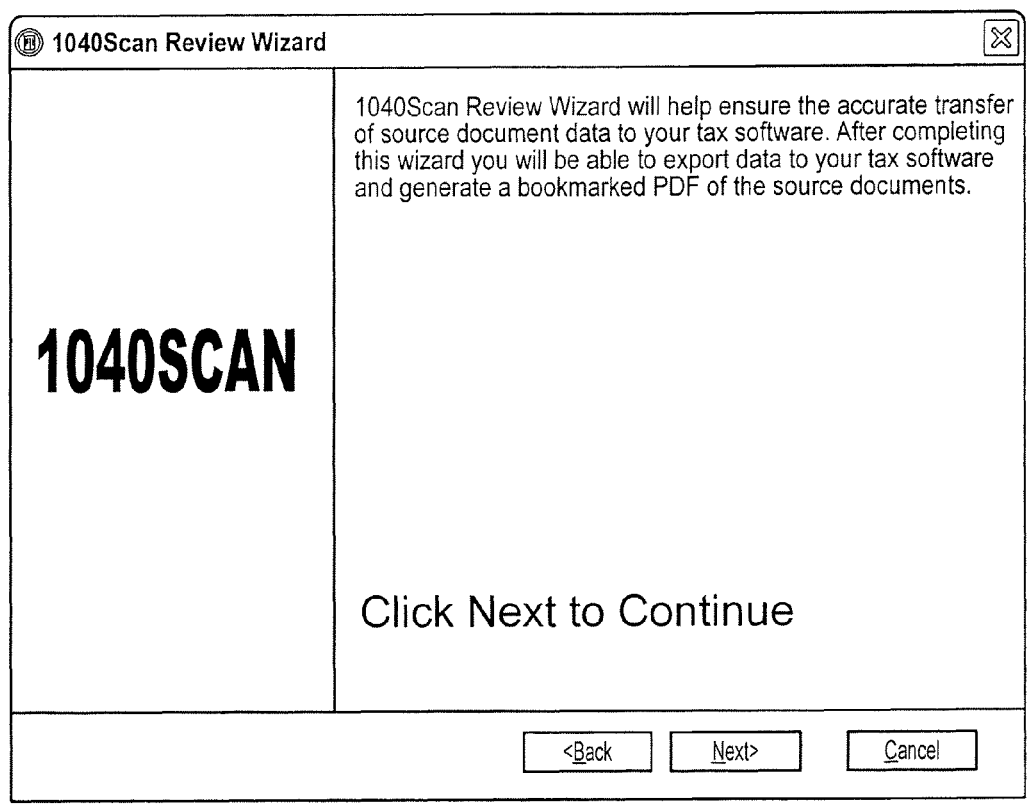

In step 300, as shown in FIGS. 1 and 4, the tax data is reviewed and modified if necessary. A sample screen shot of the start of the review 301 can be seen in FIG. 5. In step 302(*a*), a determination of whether auto-verification is possible/was done is made. As stated above, auto-verification can be accomplished using business rules. For example, if the sum of box 1, box 2, and box 3 should be equal to the amount listed in box 4, and the sum of box 1, box 2, and box 3 actually do equal the amount listed in box 4, then it is likely that the data indicated in box 1, box 2, box 3, and/or box 4 are correct. Thus, there may not be a need to further verify the data in box 1, box 2, box 3, and/or box 4. If auto-verification is possible/was done, then the next step is step 304 and steps 302(*b*) and 303 are skipped.

If auto-verification is not possible/was not done, then the potentially erroneous tax data is verified in step 302(*b*) with a sample screen shot shown in FIG. 6. This can be done manually, for example, by a person. As shown in FIG. 6, items 32*a-c* are relevant portions of the electronic image 50 of the taxpayer source document 30 that correspond to the extracted tax data. Items 32*d-f* are the extracted tax data while items 32*g-i* are check boxes to indicate if a field is correct. For example, item 32*a* shows an amount of "11640" from the relevant portion of the electronic image 50, and item 32*d* shows that the extracted tax data has been corrected to be "1160" as indicated by the check mark on item 32*g*. Item 32*b* shows an amount "950" from the relevant portion of the electronic image 50, and item 32*h* shows the extracted tax data was "450" before it is corrected as indicated by the unmarked box on item 32*h*. Item 32*c* shows the text "FURNITURE" from the relevant portion of the electronic image 50, and item 32*f* shows the extracted tax data has been modified to correctly reflect "FURNITURE" as indicated by the check mark on item 32*i*.

When the relevant portions of items 32*a-c* are clicked on, for example, by a mouse cursor, the entire electronic image 50 of the taxpayer source document 30 is displayed. Alternatively, when buttons 32*g-i* are clicked on, for example, by a mouse, or a short cut key on a keyboard such as "F1" or "F2" (not shown) is depressed, the entire electronic image 50 of the taxpayer source document 30 can also be displayed. This allows the person reviewing the tax data to view other portions of the electronic image 50. The person can also click on a portion of the electronic image 50 to redisplay the previous screen shot as shown in FIG. 6.

Figure 7:
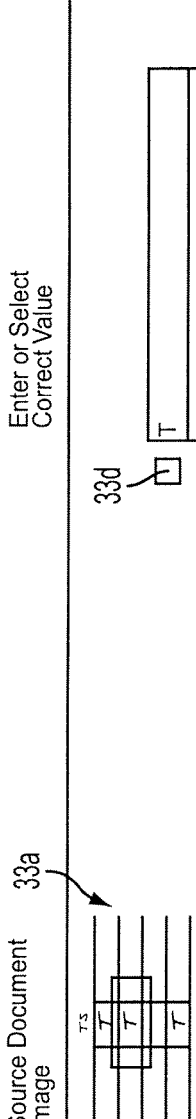

In step 303, tax data known to be erroneous is corrected. This can be done manually, for example, by a person. It is also contemplated that this could be done by one or more people. For example, after a first person has corrected the known errors, a second person can check the first person's work. Furthermore, it is also possible that the second person corrects the known errors independently of the first person and the two corrected versions are compared against each other. As shown in FIG. 7, items 33*a-c* are relevant portions of the electronic image 50 of the taxpayer source document 30 that correspond to the extracted tax data and items 33*d-f* are the erroneously extracted tax data. The user can visually inspect 33*d-f* to determine if they match with the relevant portions 33*a-c* of the electronic image 50. If an item is the correct data e.g. 33*f* matches with 33*c*, then no further action is necessary. For example, item 33*c* shows the term "APPRAISAL" which has already been correctly extracted as the term "Appraisal" in item 33*f*. Thus, there is no action necessary for 33*c*.

However, if one or more of the items do not match, e.g. the value displayed in 33*d* does not match with the value in 33*a*, then further action may be necessary. For example, item 33*a* shows the character "T" while item 33*d* shows the options to be either "T" or "S" with "T" corresponding to "taxpayer" and "S" corresponding to "spouse." However, even if there is not a match, no action may be necessary because the erroneous tax data was already corrected during extraction. For example, the item 33*b* shows the term "PURCHASE" which has already been corrected during extraction in item 33*e* as the term "Purchase" prior to this step and without any user intervention or action.

Figure 8:
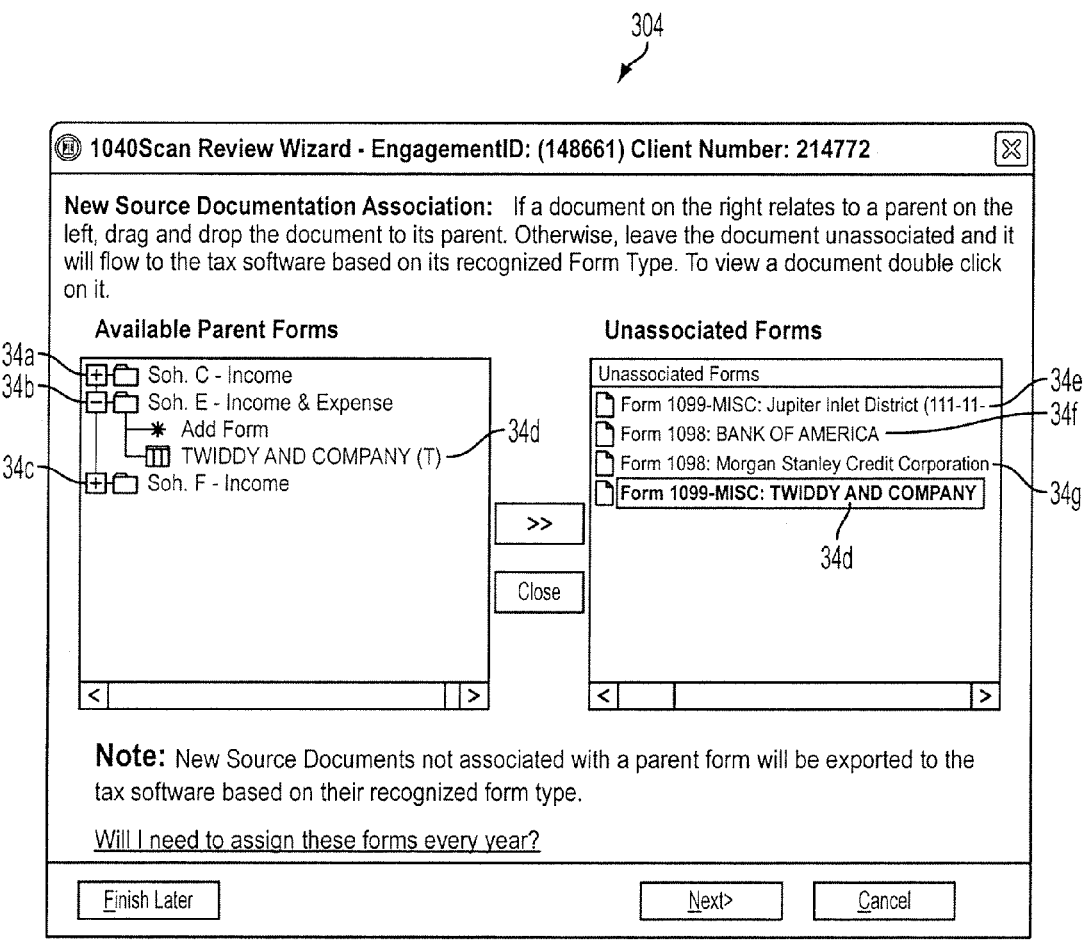

In step 304, the unassociated taxpayer source documents are associated with parent taxpayer source documents. Unassociated taxpayer source documents can be taxpayer source documents, for example, that could be used for various purposes. For example, taxpayer source documents, related to a real estate owned by the taxpayer, can be used as an itemized deduction if it is a personal residence or it can be a rental property expense if it relates to an investment property. Thus, the unassociated taxpayer source document related to the real estate owned by the taxpayer can, for example, be associated with a parent taxpayer source document such as a Schedule E rental property, or a personal itemized deduction form. If it is associated with a Schedule E rental property, then the previously unassociated taxpayer source document would be used in the calculation of the Schedule E net income or loss. If it is associated with a personal itemized deduction form, then the previously unassociated taxpayer source document can be used for itemized deduction calculations. For example, in FIG. 8, items 34a-c are parent forms and items 34d-g are unassociated taxpayer source documents. As shown by the highlighting, unassociated taxpayer source document 34d is now associated with parent form 34b.

In step 305, the taxpayer source documents which have been superseded or are identical copies are noted as being superseded. A taxpayer source document can be superseded, for example, if the issuer of the source document (e.g., a bank or brokerage firm) issues a corrected copy of the same source document. A taxpayer source document can also be superseded, for example, if it contains data which is erroneous such as wrong gross wages. This can be seen if one electronic image of the taxpayer source document such as a W-2 indicates that the gross wages were $48,786 while another electronic image of the taxpayer source document indicates that the gross wages were $47,886. If the gross wages were actually $48,786, the other taxpayer source document indicating that the gross wages were $47,886 would be superseded. Also, this step can be used to identify identical copies of the same document. For instance, many times a taxpayer receives 3 copies of the same tax form. If three copies of the same taxpayer source document are created as three separate electronic images, only one taxpayer source document should be entered into the return. This feature identifies that there are three identical copies and allows the user to exclude two of them.

As shown in FIG. 9, page 35a and page 35b have both been identified as the same taxpayer source document 35. This indicates that one of the two documents is either superseded or an identical copy of the other. If a check mark is placed by item 35a and/or item 35b, for example, then it indicates that the check marked electronic image of the taxpayer source document has been superseded or is a duplicate copy. For example, item 35b has a check mark placed next to it and it is noted as being superseded while item 35a does not have a check mark placed next to it indicating that it has not been superseded.

In step 306, the electronic images 50 of the taxpayer source documents 30 are checked to determine if the electronic images 50 of the taxpayer source documents 30 are duplicates. Duplicates can be, for example, two electronic images of the taxpayer source documents with a first electronic image of the taxpayer source document being created by the employer or payer of the taxpayer and the second electronic image of the taxpayer source document being an organizer page that was completed by the taxpayer (containing the same data as the first taxpayer source document). The data on the organizer page would be considered duplicate since the data on the source document generated by the actual employer, payer, etc. is the copy that gets reported to the IRS and thus the copy that needs to be used to prepare the return.

If duplicates are not removed, the second electronic image of the taxpayer source document could be treated as a separate taxpayer source document. Thus, there could be errors, for example, if the duplicate electronic images of the taxpayer source documents were a W-2 and a Wages organizer page. In that case, the first electronic image of the taxpayer source document and the second electronic image of the taxpayer source document would be treated as two separate W-2s. Thus, it would seem that the taxpayer has two jobs instead of just one and two incomes instead of one. This could cause problems when calculating how much taxes the taxpayer owes, or how much refunds the taxpayer is entitled to receive. For example, in FIG. 10, items 36a-e represent a first set of electronic images of taxpayer organizer pages while items 36f-j represent a second set of electronic images of taxpayer source documents. Here, item 36c and item 36h are duplicates of taxpayer source documents. Boxes 36k-o correspond to items 36a-e, e.g. box 36k corresponds to item 36a, box 36l corresponds to item 36b, etc. If item 36a is a duplicate, then box 36k can be marked to indicate that item 36a is a duplicate. Likewise, if 36e is also a duplicate, then box 36o can also be marked to indicate that 36e is a duplicate. It is contemplated that only items 36a-e could be duplicates and not items 36f-j.

Figure 11:
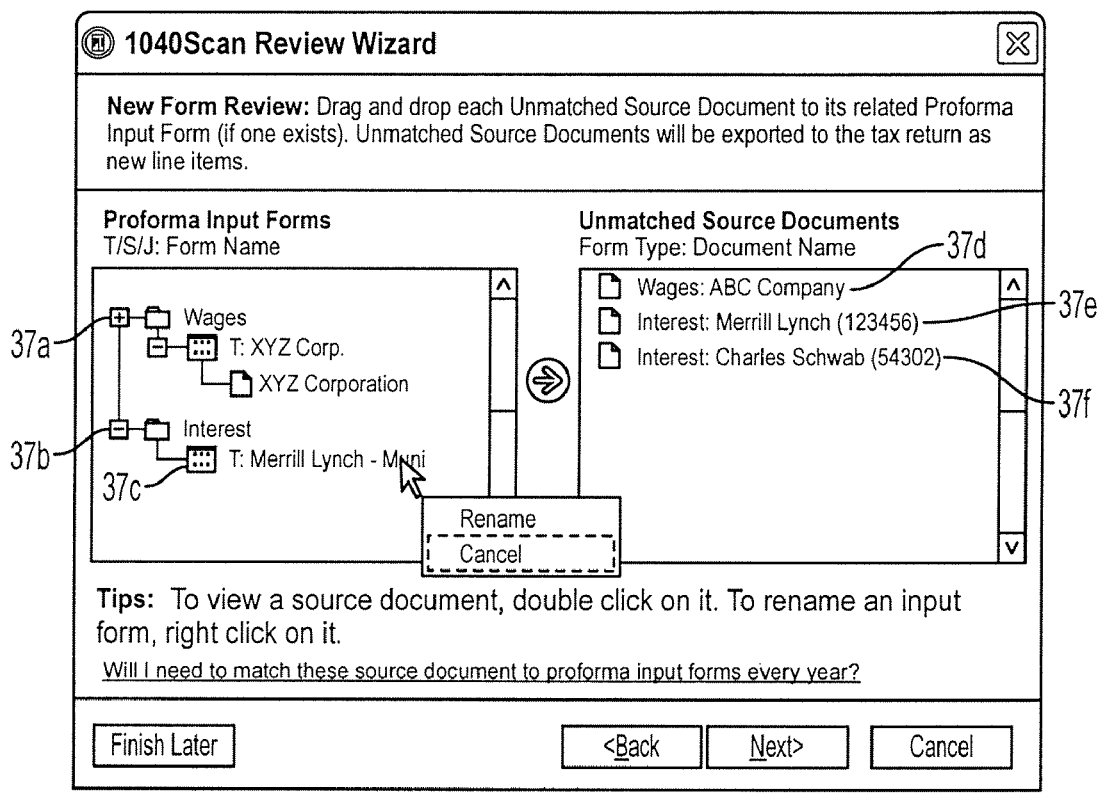

Optionally in step 307, as shown in FIG. 11, if the electronic image 50 of the taxpayer source document 30 was not found within the proforma data, a user can drag and drop the listed electronic image 50 of the taxpayer source document 30 into the correct folder in the proforma data. For example, item 37a and item 37b are folders in the proforma data while item 37c is a document that was dragged and dropped in folder 37b. Items 37d-f are electronic images 50 of taxpayer source documents 30 that have not been dragged and dropped into folders in the proforma data. By dragging and dropping the electronic image 50 of the taxpayer source document 30 into the correct folder in the proforma data, the electronic image 50 of the taxpayer source document matches up with the proforma data. Any electronic images 50 of the taxpayer source documents 30 that are not drag and dropped into the folders can be set up as a new record.

Figure 12:
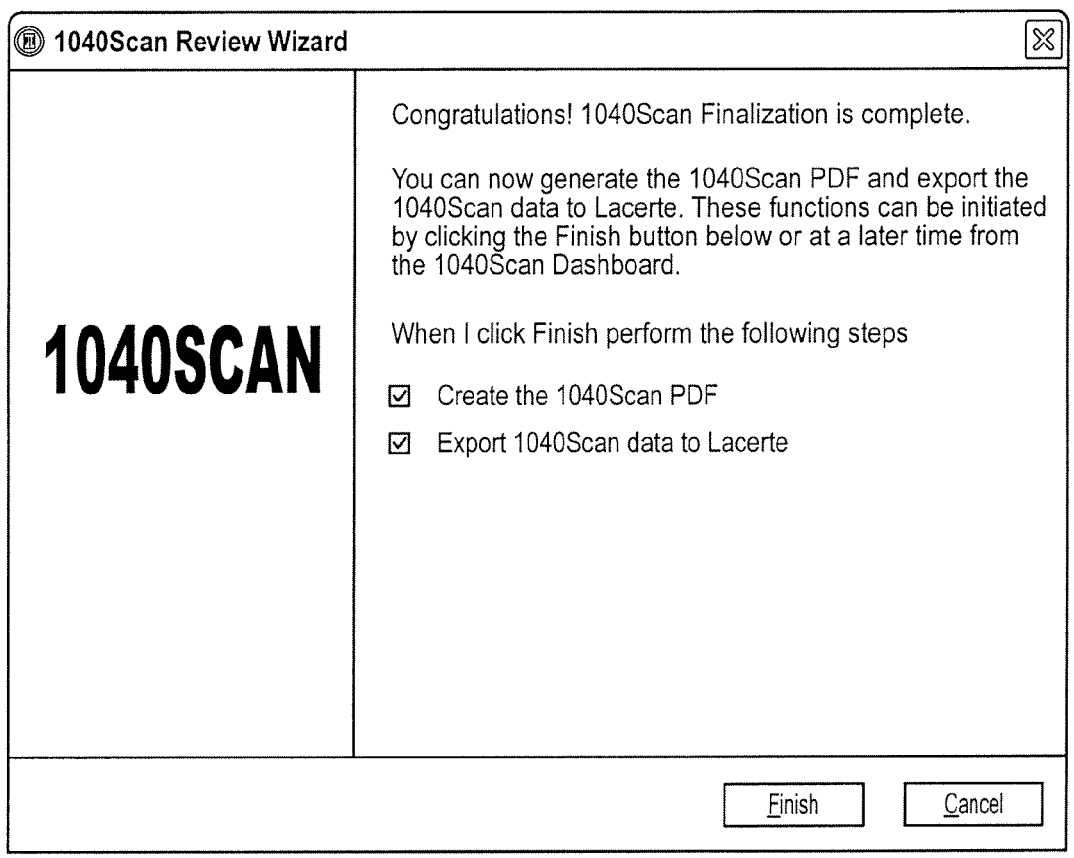

In step 308, as shown in a screen shot depicted in FIG. 12, the step 300 is completed.

In step 400, the tax data 90 that has been extracted from the electronic images 50 of the taxpayer source documents 30 and used to update the proforma data and is stored in tax software file system database 60. Thus, if the proforma data previously only contained wage information for the year 2005, and the current year for the taxpayer source document is 2006, the proforma data can be updated to include not only the wage information from the year 2005, but also the wage information from the year 2006.

Figure 13:
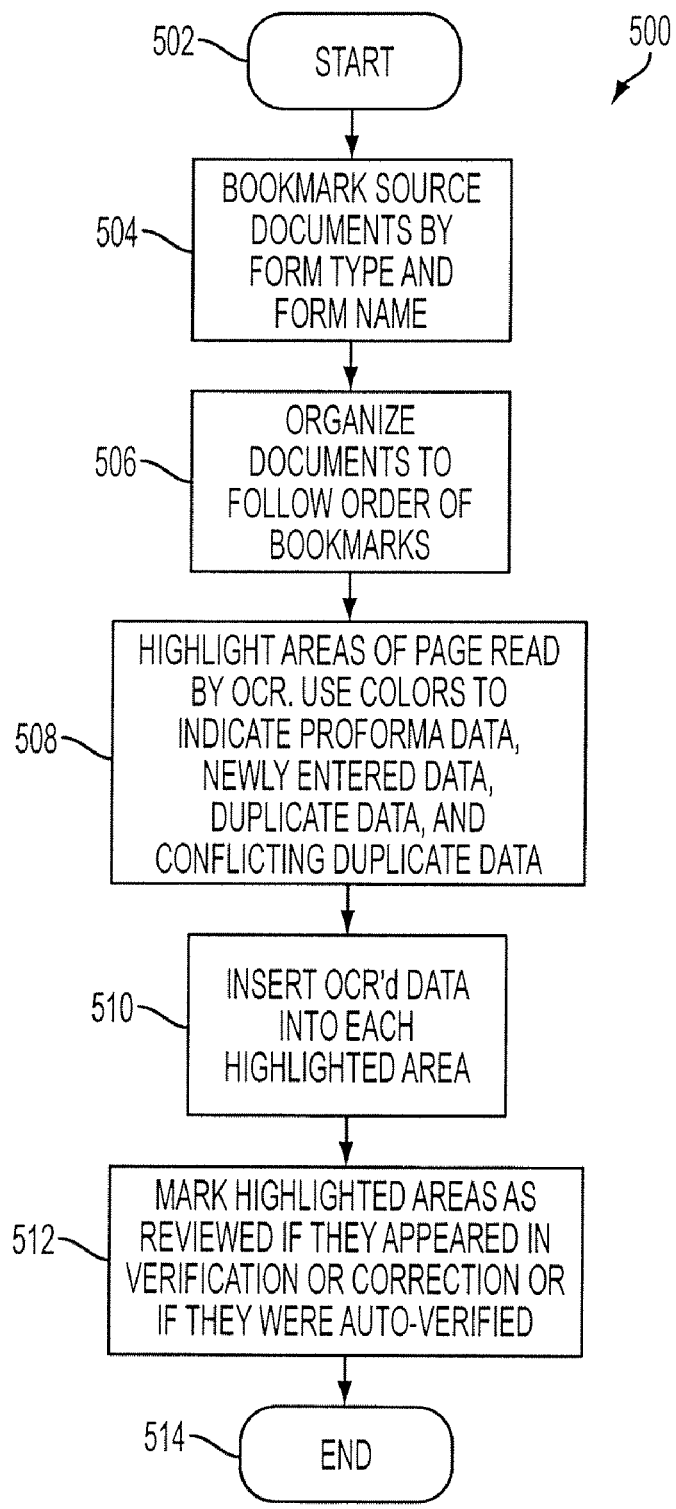
FIG. 13 is a flow chart of a method of creating an organized source document file in accordance with an embodiment of the present invention.

Referring to FIGS. 1 and 13, optionally in step 500, the extracted tax data and/or the electronic images 50 of the taxpayer source documents 30 can be used to create an electronic document 55 that includes the extracted tax data. The electronic document can be, for example, a PDF, a Microsoft Word® document, etc. Step 502 signifies the start of step 500. In step 504, the electronic images 50 of the taxpayer source documents 30 can be bookmarked in various ways such as by the type of taxpayer source document, the name of the taxpayer source document, or even the classification of the taxpayer source document (e.g., a wage document, an investment document, or a deduction document).

In step 506, the electronic image 50 of the taxpayer source document 30 can be optionally organized to follow the order of the bookmarks. In step 508, the areas of the electronic image 50 of the taxpayer source document 30 where tax data was extracted, can be highlighted, for example, in various colors. For example, these colors can be aqua, yellow, green, or red. Aqua, for example, can signify that the extracted tax data was unnecessary because it was already in proforma data. Yellow, for example, can signify that the extracted tax data was exported to the tax software database in step 400. Red, for example, can signify that the extracted tax data may be erroneous. Green, for example, can signify that the extracted tax data was exported to the tax software database in step 400 from another source document and therefore nothing was done with the green highlighted instance of the data. It is contemplated that other colors could be used. In step 510, the extracted tax data can be inserted in the highlighted areas of the electronic image of the taxpayer source document. Furthermore, in step 512, those highlighted areas which have been reviewed or corrected (either manually or automatically through auto-verification), for example, in steps 302(*a*), 302(*b*) and/or 303 can be marked such as with a check mark. Step 514 signifies the end of Step S500.

The result of step 500, for example, can be the creation of an electronic document 55 that includes some or all of the extracted tax data. The electronic document 55 can also include unidentified electronic images.

Although exemplary embodiments of the present invention has been shown and described, many other changes, combinations, omissions, modifications and substitutions, in addition to those set forth in the above paragraphs, may be made by one having skill in the art without necessarily departing from the spirit and scope of this present invention. Accordingly, the present invention is not intended to be limited by the preferred embodiments, but is to be defined by reference to the appended claims.

What is claimed is:

1. A method of processing a tax payer source document comprising:
   receiving, at a computer system, proforma data and an electronic image of a taxpayer source document;
   determining, using a processor of the computer system, a type of tax statement for the taxpayer source document from the electronic image of the taxpayer source document;
   using the proforma data to verify, using the processor of the computer system, the determination of the type of the tax statement for the electronic image of the taxpayer source document by searching for an identification code within the electronic image of the taxpayer source document to determine whether the identification code matches the proforma data;
   extracting, using the processor of the computer system, data from the electronic image of the taxpayer source document;
   determining, using the processor of the computer system, whether the extracted data from the electronic image of the taxpayer source document has an error;
   using the proforma data to verify, using the processor of the computer system, the accuracy of the extracted data from the electronic image of the taxpayer source document; and
   creating, using the processor of the computer system, an electronic document that includes the extracted data.

2. The method of processing a taxpayer source document of claim 1 wherein the data is tax data.

3. The method of processing a taxpayer source document of claim 2 the further comprising identifying, using optical character recognition, the type of the tax statement for the taxpayer source document by searching for predetermined characters in predetermined locations of the electronic image of the taxpayer source document.

4. The method of processing a taxpayer source document of claim 3 further comprising selecting a routine corresponding to the type of tax statement for the taxpayer source document.

5. The method of processing a taxpayer source document of claim 4 wherein using proforma data to verify the type of taxpayer source document for the electronic image of the taxpayer source document further includes using the routine corresponding to the type of taxpayer source document and a supplemental database to verify the type of tax statement for the taxpayer source document.

6. The method of processing a taxpayer source document of claim 5 wherein using extracting data from the electronic image of the taxpayer source document further includes using the routine corresponding to the type of tax statement for the taxpayer source document and the supplemental database to extract tax data from the electronic image of the taxpayer source document.

7. The method of processing a taxpayer source document of claim 6 wherein verifying the extracted data from the electronic image of the taxpayer source document that may have potential errors includes flagging the extracted tax data from the electronic image of taxpayer source document that have potential errors based on an inability to extract the tax data with a predetermined amount of accuracy or through an analysis of the tax data using business rules to determine which extracted data needs to be verified and verifying the extracted tax data from the electronic image of the taxpayer source document that are flagged.

8. The method of processing a taxpayer source document of claim 7 wherein the taxpayer source document is either a wage document, an investment document, or a deduction document.

9. The method of processing a taxpayer source document of claim 8 further comprising the step of correcting the extracted tax data from the electronic image of the taxpayer source document that are flagged.

10. The method of processing a taxpayer source document of claim 9 further comprising the step of assigning unassociated images of the taxpayer source documents to parent taxpayer source documents.

11. The method of processing a taxpayer source document of claim 10 further comprising the step of assigning unassociated electronic images of the taxpayer source documents to parent taxpayer source documents and determining which electronic images of the taxpayer source documents are superseded.

12. The method of processing a taxpayer source document of claim 11 further comprising the step of determining which electronic images of the taxpayer source documents are duplicates and which electronic images of the taxpayer source documents are new taxpayer source documents.

13. The method of processing a taxpayer source document of claim 12 further comprising supplementing the proforma data with tax data extracted from the electronic image of the taxpayer source documents.

14. A method of processing a taxpayer source document comprising:
   receiving, at a computer system, proforma data and an electronic image of a taxpayer source document;
   determining, using a processor of the computer system, a type of tax statement for the taxpayer source document from the electronic image of the taxpayer source document;
   selecting, using the processor of the computer system, a routine corresponding to the type of the tax statement for the taxpayer source document;
   using the routine corresponding to the type of the tax statement for the taxpayer source document and proforma data to verify, using the processor of the computer system, the determination of the type of the tax statement for the taxpayer source document by searching for an identification code within the electronic image of the taxpayer source document;
   using the routine corresponding to the type of the tax statement for the taxpayer source document and proforma data to extract, using the processor of the computer system, tax data from the electronic image of the taxpayer source document;
   determining, using the processor of the computer system, whether the extracted data from the electronic image of the taxpayer source document has an error by flagging data that may be an error and using the proforma data to verify, using the processor of the computer system, the accuracy of the flagged data from the electronic image of the taxpayer source document, wherein the error may be either through an inability to extract the tax data with a predetermined amount of accuracy or an analysis of the extracted tax data using business rules to determine which extracted tax data needs to be verified; and creating, using the processor of the computer system, an electronic document that includes the extracted data.

15. The method of processing a taxpayer source document of claim 14 further comprising identifying, using optical character recognition identifies the taxpayer source document by searching for predetermined characters in predetermined locations of the electronic image of the taxpayer source document.

16. The method of processing a taxpayer source document of claim 15 further comprising using a supplemental database to verify the type of taxpayer source document for the electronic image of the taxpayer source document and to extract tax data from the electronic image of the taxpayer source document.

17. The method of processing a taxpayer source document of claim 16 wherein the taxpayer source document is either a wage document, an investment document, or a deduction document.

18. The method of processing a taxpayer source document of claim 17 further comprising correcting the extracted tax data from the electronic image of the taxpayer source document that are flagged.

19. The method of processing a taxpayer source document of claim 18 further comprising:
   verifying and correcting the extracted tax data from the electronic image of the taxpayer source document that are flagged;
   assigning unassociated images of the taxpayer source documents to parent taxpayer source documents;
   determining which electronic images of the taxpayer source documents are superseded;
   determining which electronic images of the taxpayer source documents are duplicates;
   determining which electronic images of the taxpayer source documents are new taxpayer source documents; and
   supplementing the proforma data with tax data extracted from the electronic image of the taxpayer source documents.

20. A method of processing a taxpayer source document comprising:
   receiving, at a computer system, proforma data and an electronic image of a taxpayer source document;
   determining, using a processor of the computer system, a type of tax statement of the taxpayer source document for the electronic image of the taxpayer source document using optical character recognition by searching for predetermined characters in predetermined locations of the electronic image of the taxpayer source document, wherein the taxpayer source document is either a wage document, an investment document, or a deduction document;
   selecting, using the processor of the computer system, a routine corresponding to the type of taxpayer source document;
   using the routine corresponding to the type of taxpayer source document, optical character recognition, a supplemental database, and proforma data to verify, using the processor of the computer system, the determination of the type of the taxpayer source document for the electronic image of the taxpayer source document by searching for an identification code within the electronic image of the taxpayer source document;
   using the routine corresponding to the type of taxpayer source document, optical character recognition, the supplemental database, and proforma data to extract, using the processor of the computer system, tax data from the electronic image of the taxpayer source document;
   determining, using the processor of the computer system, whether the extracted data from the electronic image of the taxpayer source document has an error by flagging data that may be an error, using the proforma data to verify the accuracy of the flagged data, and correcting, using the processor of the computer system, inaccurate data from the electronic image of the taxpayer source document, wherein the error may be either through an inability to extract the tax data with a predetermined amount of accuracy or an analysis of the extracted tax data using business rules to determine which extracted tax data needs to be verified;
   assigning, using the processor of the computer system, the electronic image of the taxpayer source documents to a parent taxpayer source document if the electronic image of the taxpayer source document is not associated with a parent taxpayer source document;
   determining, using the processor of the computer system, whether the electronic image of the taxpayer source document is superseded;
   determining, using the processor of the computer system, whether the electronic image of the taxpayer source document is a duplicate;
   determining, using the processor of the computer system, whether the electronic image of the taxpayer source document is a new taxpayer source document;
   supplementing, using the processor of the computer system, the proforma data with tax data extracted from the electronic image of the taxpayer source document; and
   creating, using the processor of the computer system, an electronic document that includes the extracted tax data.

21. A method of processing a tax payer source document comprising:
   receiving, at a computer system, an electronic image of a taxpayer source document;
   determining, using a processor of the computer system, a type of tax statement for the taxpayer source document from the electronic image of the taxpayer source document;
   using a supplemental database to verify the determination of the type of the tax statement for the electronic image of the taxpayer source document by searching for an identification code within the electronic image of the taxpayer source document to determine whether the identification code matches data from the supplemental database;
   extracting, using the processor of the computer system, data from the electronic image of the taxpayer source document;
   determining, using the processor of the computer system, whether the extracted data from the electronic image of the taxpayer source document has an error;
   using the supplemental database to verify the accuracy of the extracted data from the electronic image of the taxpayer source document; and
   creating, using the processor of the computer system, an electronic document that includes the extracted data.

* * * * *